US010748305B2

(12) United States Patent
Kawakami

(10) Patent No.: US 10,748,305 B2
(45) Date of Patent: Aug. 18, 2020

(54) IMAGE CAPTURING APPARATUS THAT CAN REDUCE AMOUNT OF DATA THAT IS TO BE RECORDED, METHOD FOR CONTROLLING THE IMAGE CAPTURING APPARATUS, AND STORAGE MEDIUM

(71) Applicant: CANON KABUSHIKI KAISHA, Tokyo (JP)

(72) Inventor: Masashi Kawakami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 218 days.

(21) Appl. No.: 15/951,280

(22) Filed: Apr. 12, 2018

(65) Prior Publication Data

US 2018/0300904 A1 Oct. 18, 2018

(30) Foreign Application Priority Data

Apr. 18, 2017 (JP) ................................. 2017-082250

(51) Int. Cl.

| | |
|---|---|
| *H04N 5/341* | (2011.01) |
| *H04N 5/77* | (2006.01) |
| *H04N 5/349* | (2011.01) |
| *H04N 5/907* | (2006.01) |
| *G06T 9/00* | (2006.01) |

(52) U.S. Cl.

CPC ............... *G06T 9/00* (2013.01); *H04N 5/341* (2013.01); *H04N 5/349* (2013.01); *H04N 5/772* (2013.01); *H04N 5/907* (2013.01)

(58) Field of Classification Search

None

See application file for complete search history.

(56) References Cited

U.S. PATENT DOCUMENTS

2016/0072999 A1* 3/2016 Miyasako ............ H04N 5/2329 348/208.6
2016/0366335 A1* 12/2016 Miyata ............... H04N 5/23232

FOREIGN PATENT DOCUMENTS

JP 2009-048487 A 3/2009

* cited by examiner

*Primary Examiner* — Christopher Braniff

(74) *Attorney, Agent, or Firm* — Cowan, Liebowitz & Latman, P.C.

(57) ABSTRACT

An image capturing apparatus comprises: an image capturing unit configured to capture a plurality of RAW image data sets while shifting a position of an image sensor relative to an optical axis; a difference generation unit configured to generate difference data; an encoding unit configured to encode the difference data; and a recording unit configured to record the encoded difference data, wherein, when generating difference data regarding a first RAW image data set and a second RAW image data set included in the plurality of RAW image data sets, the difference generation unit shifts the first RAW image data set, and obtains a difference between pieces of pixel data having the same color component, respectively included in the first RAW image data set and the second RAW image data set, to generate the difference data.

13 Claims, 9 Drawing Sheets

OBTAIN DIFFERENCE BETWEEN G1 PIXELS

ONE LINE OF ENCODING TARGET IMAGE DATA SET CAPTURED AT TIME t1

ONE LINE OF REFERENCE IMAGE DATA SET CAPTURED AT TIME t0

OBTAIN DIFFERENCE BETWEEN G1 PIXELS

REFERENCE IMAGE DATA SET CAPTURED AT TIME t1

ENCODING TARGET IMAGE DATA SET CAPTURED AT TIME t2

IMAGE CAPTURING APPARATUS THAT CAN REDUCE AMOUNT OF DATA THAT IS TO BE RECORDED, METHOD FOR CONTROLLING THE IMAGE CAPTURING APPARATUS, AND STORAGE MEDIUM

BACKGROUND OF THE INVENTION

Field of the Invention

The present invention relates to an image capturing apparatus that can reduce the amount of data that is to be recorded, a method for controlling the same, and a storage medium.

Description of the Related Art

Recent years have seen digital cameras that record captured image data, which has not undergone development processing after being output from an image sensor (hereinafter also referred to as "RAW data set"), onto a recording medium without performing development processing.

When an image is recorded in a common JPEG format, the red (R), green (G1/G2), and blue (B) color components of the captured image data output from the image sensor are each modified so as to have eight bits, and thus the color components are thinned and then recorded. In contrast, when an image is recorded as a RAW data set, the captured image data output from the image sensor does not lose color components, and can be recorded with a large number of color gradations (no less than eight bits) being retained. Therefore, if an image is recorded as a RAW data set, the user can perform various kinds of development processing after capturing an image.

On the other hand, there is technology for applying a super-resolution technique to captured RAW data sets to obtain a higher-definition image. Specifically, a method for combining a plurality of RAW data sets captured while the image sensor is shifted is known as a technique to combine a plurality of images to generate a super-resolution image. However, a super-resolution technique, which uses a plurality of RAW data sets, needs a plurality of RAW data sets that have a significantly larger data amount compared to JPEG data. Therefore, there is a problem in which a considerable amount of empty space in the recording medium is consumed.

To solve such a problem, Japanese Patent Laid-Open No. 2009-48487 discloses a technique to classify a plurality of RAW data sets into reference images and target images, and compress the target images, to reduce the data amount of the plurality of RAW data sets that are recorded when super-resolution processing is performed.

However, although the above-described conventional art discloses a method for compressing the target images using a JPEG compression technique to reduce the amount of data that is recorded when still image capturing is performed, the relationship between the plurality of RAW data sets (e.g. the correlation between reference images and target images) is not taken into consideration.

SUMMARY OF THE INVENTION

The present invention has been made in consideration of the aforementioned problems, and realizes a technique to reduce the recording data amount of a plurality of RAW data sets captured at points in time that are close to each other.

In order to solve the aforementioned problems, one aspect of the present invention provides an image capturing apparatus comprising: an image capturing unit configured to capture a plurality of RAW image data sets while sequentially shifting a position of an image sensor relative to an optical axis; a difference generation unit configured to generate difference data regarding the plurality of RAW image data sets; an encoding unit configured to encode the difference data; and a recording unit configured to record the encoded difference data, wherein, when generating difference data regarding a first RAW image data set and a second RAW image data set included in the plurality of RAW image data sets, the difference generation unit shifts the first RAW image data set, and obtains a difference between pieces of pixel data having the same color component, respectively included in the first RAW image data set and the second RAW image data set, to generate the difference data.

Another aspect of the present invention provides, a control method of an image capturing apparatus that captures a plurality of RAW image data sets while a position of an image sensor relative to an optical axis is sequentially shifted, the method comprising: generating difference data regarding the plurality of RAW image data sets; encoding the difference data; and recording the encoded difference data, wherein, when difference data regarding a first RAW image data set and a second RAW image data set included in the plurality of RAW image data sets is to be generated, the first RAW image data set is shifted, and a difference between pieces of pixel data having the same color component, respectively included in the first RAW image data set and the second RAW image data set, is obtained, and thus the difference data is generated.

Still another aspect of the present invention provides, a non-transitory computer-readable storage medium storing a program for causing a computer to execute a control method of an image capturing apparatus that captures a plurality of RAW image data sets while a position of an image sensor relative to an optical axis is sequentially shifted, the method comprising: generating difference data regarding the plurality of RAW image data sets; encoding the difference data; and recording the encoded difference data, wherein, when difference data regarding a first RAW image data set and a second RAW image data set included in the plurality of RAW image data sets is to be generated, the first RAW image data set is shifted, and a difference between pieces of pixel data having the same color component, respectively included in the first RAW image data set and the second RAW image data set, is obtained, and thus the difference data is generated.

According to the present invention, it is possible to reduce the recording data amount of a plurality of RAW data sets captured at points in time that are close to each other.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

The following describes an exemplary embodiment of the present invention in detail with reference to the drawings. Note that the following describes an example in which a given digital camera that can capture an image while shifting an image sensor is used as an example of an image capturing apparatus. However, the present embodiment is not limited to a digital camera, and is applicable to any device that can capture an image while shifting an image sensor. These devices may include, for example, mobile telephones including smartphones, game machines, tablet terminals, watch type and glasses type information terminals, medical devices, surveillance systems including surveillance cameras, and in-vehicle system devices.

Configuration of Digital Camera 100

Figure 1:
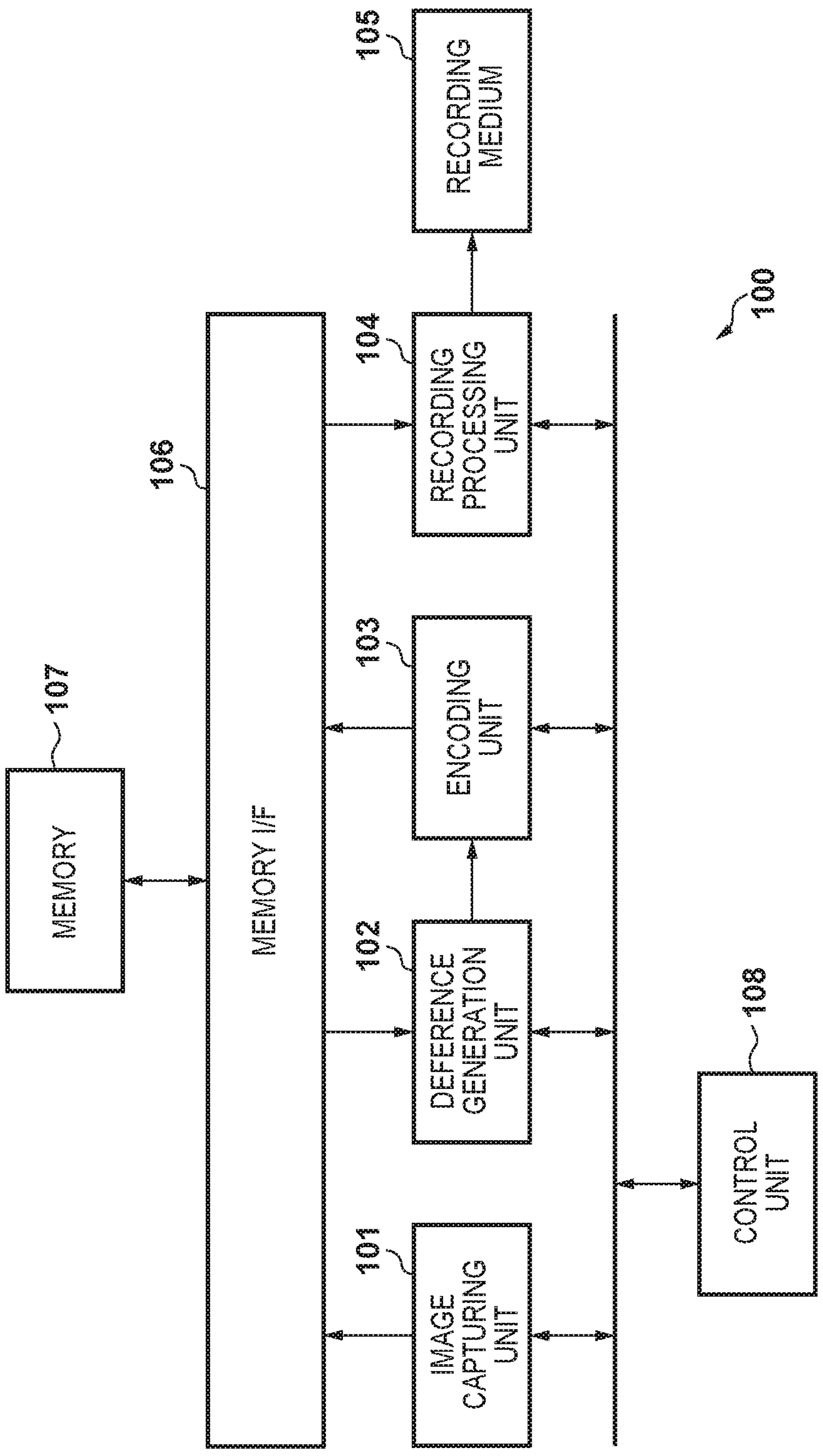
FIG. 1 is a block diagram showing an example of a functional configuration of a digital camera according to a first embodiment of the present invention.

FIG. 1 is a block diagram showing an example of a functional configuration of a digital camera 100. Note that one or more functional blocks out of those shown in FIG. 1 may be realized using hardware such as an ASIC or a programmable logic array (PLA), and may be realized by a programmable processor such as a CPU or an MPU executing software. Also, the functional blocks may be realized using a combination of software and hardware. Therefore, in the following description, even if different functional blocks are described as entities that perform certain operations, pieces of hardware that realize the functional blocks may be the same.

The digital camera 100 includes an image capturing unit 101, a difference generation unit 102, an encoding unit 103, a recording processing unit 104, a recording medium 105, a memory I/F 106, a memory 107, and a control unit 108.

The control unit 108 includes, for example, a CPU (an MPU), and loads a program recorded on a ROM (not shown) to the memory 107, and executes the program to control the functional blocks of the digital camera 100 or to control data transfer between the functional blocks. The control unit 108 may additionally include an internal RAM, and may read the program from the ROM, load the program to the RAM, and execute the program. In the example shown in FIG. 1, the control unit 108 controls the operations of the image capturing unit 101, the difference generation unit 102, the encoding unit 103, and the recording processing unit 104 to realize the processing described below.

The image capturing unit 101 includes: a lens optical system that includes an optical lens, a diaphragm, and a focus control and lens driving unit, and that can perform optical zooming; and an image sensor (an image capturing device) that is constituted by a two-dimensional array of a plurality of pixels that each have a photoelectric conversion element. Each pixel of the image sensor performs photoelectrical conversion on the subject optical image formed by the lens optical system, and also performs analogue-to-digital conversion using an A/D conversion circuit, and then outputs digital signals respectively corresponding to the pixels (i.e. a RAW image data set, which may simply be referred to as "RAW data set"). The image sensor may be a CCD (Charge-Coupled Device) image sensor, a CMOS (Complementary Metal Oxide Semiconductor) image sensor, or the like. The image sensor has color filters arranged in a primary color Bayer arrangement, for example, and each pixel is provided with one of R (red), G1/G2 (Green), and B (blue) color filters. Also, the image sensor is configured such that the position of the image sensor relative to the optical axis can be sequentially shifted under the control of the control unit 108. In the present embodiment, a configuration in which the position of the image sensor is sequentially shifted is employed. However, the present invention is not limited to such a configuration, and may be provided with an optical axis shifter mechanism, and the optical axis may be shifted by the optical axis shifter mechanism so that the position of the image sensor relative to the optical axis is shifted.

Figure 2A:
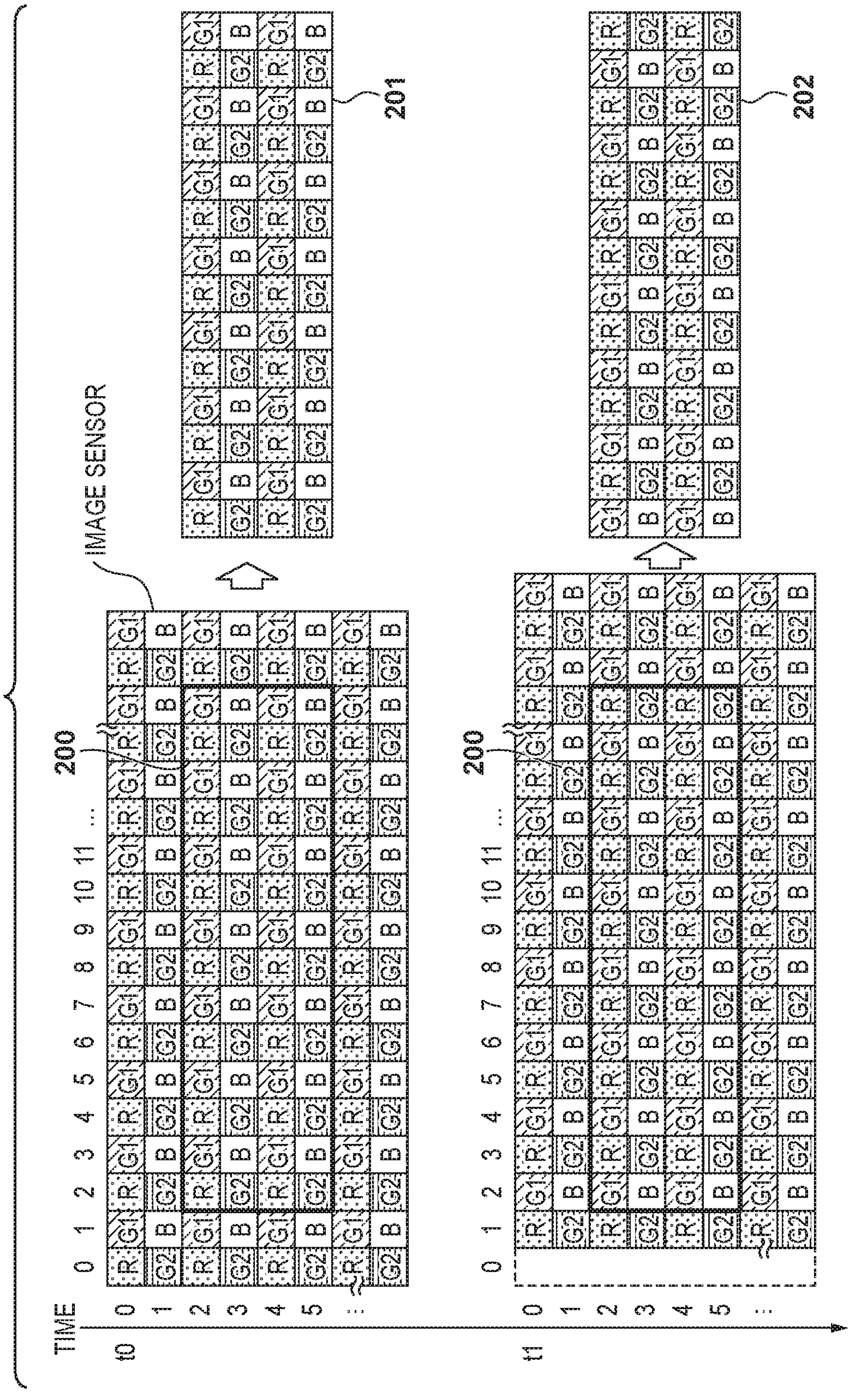
FIGS. 2A and 2B are diagrams illustrating a relationship between an image sensor and a RAW data set when images are sequentially captured while the image sensor is shifted, according to the first embodiment.
Figure 2B:
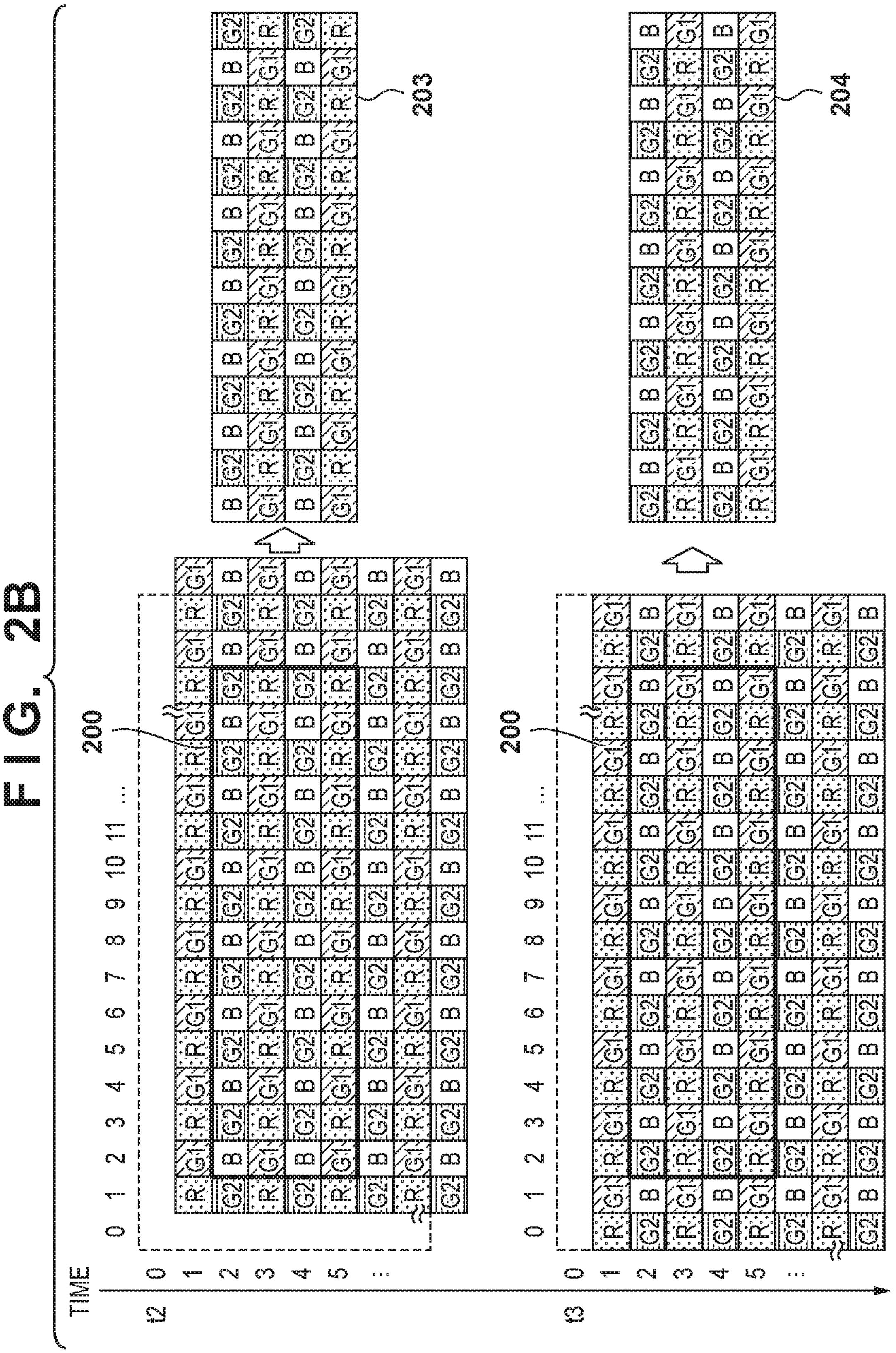

With reference to FIGS. 2A and 2B, the following specifically describes operations that are performed when the image sensor is shifted. FIGS. 2A and 2B schematically show a relationship between the position of the image sensor (and how the shifted image sensor is irradiated with irradiation light) and a RAW data set when images are successively captured, while the position of the image sensor is sequentially shifted by one pixel at a time. In this figure, time flows from the top to the bottom of the figure (from t0 to t3).

The left parts in FIGS. 2A and 2B show the positions of the image sensor at the respective points in time (t0 to t3), and how a region 200 (indicated by the thick frames in the figure) of the image sensor is irradiated with irradiation light when the image sensor is located at each of the positions. The underlined numbers on the left and the top of the image sensor indicate the coordinates that express the respective positions of the pixels on the image sensor.

The right parts in FIGS. 2A and 2B show RAW data sets that are generated when the image sensor is in the states shown on the left in FIGS. 2A and 2B. Note that FIGS. 2A and 2B show examples in which RAW data sets are generated from signals acquired from pixels in a certain region (i.e. RAW data sets are not generated using all of the pixels of the image sensor).

The following specifically describes operations that are performed when images are successively captured while the image sensor is shifted by one pixel at a time.

First, at time t0, the image sensor is located at a location whose point of origin is indicated by coordinates (0,0). The image sensor is irradiated with irradiation light on the region 200 (i.e. captures an image) to generate a RAW data set 201, which is shown on the right and is arranged in raster order starting from an R component. Next, at time t1, the image sensor is shifted to the right by one pixel from the state at time t0, and captures an image at a location whose point of origin is indicated by coordinates (1,0), to generate a RAW data set 202, which is shown on the right and is arranged in raster order starting from a G1 component.

At time t2, the image sensor is shifted downward by one pixel from the state at time t1, and captures an image at a location whose point of origin is indicated by coordinates (1,1), to generate a RAW data set 203, which is shown on the right and is arranged in raster order starting from a B component. Furthermore, at time t3, the image sensor is shifted to the left by one pixel from the state at time t2, and captures an image at a location whose point of origin is indicated by coordinates (0,1), to generate a RAW data set 204, which is shown on the right and is arranged in raster order starting from a G2 component.

Thus, by shifting the image sensor and successively capturing images, it is possible to generate four-color components, namely R, G1, G2, and B, without performing interpolation. For example, the upper left corner of the region 200, which is located at a point indicated by coordinates (2,2) at time t0, acquires an R component at time t0, a G1 component at time t1, a B component at time t2, and a G2 component at time t3, and thus acquires each color component.

Such shift operations of the image sensor are realized by the control unit 108 performing shift control to shift the image sensor included in the image capturing unit 101. The control unit 108 also supplies the difference generation unit 102 with information regarding a relative shift direction and a shift amount applied during successive image capturing.

Note that RAW data sets output from the image capturing unit 101 are stored to the memory 107 via the memory I/F 106.

With reference to FIG. 1 again, the following describes the configuration of the digital camera 100. The difference generation unit 102 is a circuit or a module that performs computation on image data, for example. The difference generation unit 102 reads out RAW data sets stored in the memory 107 via the memory I/F 106, and generates a difference between the RAW data sets. More specifically, the difference generation unit 102 reads out an encoding target image data set, which is to be encoded by the encoding unit 103, and a reference image data set, which is used to obtain a difference of the encoding target image data set, and obtains a difference and supplies difference data to the encoding unit 103.

Here, "encoding target image data set" refers to image data (a RAW data set) that is to be encoded by the encoding unit 103. Although all of the image data sets captured four times in total at time t0 to time t3 shown in FIGS. 2A and 2B are to be encoded, the image data set of one frame that is about to be encoded by the encoding unit 103 is particularly referred to as "encoding target image data set". Also, an image data set that is used to obtain a difference of the encoding target image data set when encoding the encoding target image data set is referred to as "reference image data set". For example, when the image data set captured at time t1 is the encoding target image data set, the image data set captured at time t0 (the previous image data set) is used as the reference image data set. When the image data set captured at time t2 is the encoding target image data set, the image data set captured at time t1 is used as the reference image data set, and when the image data set captured at time t3 is the encoding target image data set, the image data set captured at time t2 is used as the reference image data set. Details regarding how to obtain a difference will be described later.

Note that the method for determining the reference image data set is not limited to the above-described method, and any one of the four image data sets may be constantly used as the reference image data set. For example, the image data set captured at time t0 may be used as the reference image data set to sequentially encode the image data sets captured at time t1, time t2, and time t3 as encoding target image data sets.

When image data sets are to be processed as encoding target image data sets, the difference generation unit 102 inputs, to the encoding unit 103, information indicating the image data set used as the reference image data set, and information regarding the order in which decoding is to be performed. Then, these pieces of information are superimposed onto, for example, the header of an encoded stream that is output by the encoding unit 103. Consequently, any method may be employed to select the encoding target image data set and the reference image data set, to obtain a difference therebetween, and to easily specify and decode a combination of image data sets in a subsequent process. In the present embodiment, the encoding unit 103 performs entropy encoding.

Depending on what control the control unit 108 performs, the difference generation unit 102 may only provide the encoding unit 103 with the encoding target image data set, without reading out a reference image data set. For example, when images are successively captured, the first image data set does not have reference image data that can be used to obtain a difference, and therefore, only the encoding target image data set (the first image data set) is supplied to the encoding unit 103.

The encoding unit 103 is a circuit or a module that performs computation on image data, for example, and encodes difference data input from the difference generation unit 102. Golomb coding, run-length encoding, Huffman coding, arithmetic coding, and so on can be conceived of as examples of encoding methods. However, the encoding method applied here is not limited to the methods above, and any method may be employed. Then, the encoding unit 103 stores the image data set (encoded data set) generated through encoding, to the memory 107 via the memory I/F 106.

The recording processing unit 104 records various kinds of data, such as the encoded data set stored in the memory 107, to the recording medium 105. The recording medium 105 is a large-capacity random access recording medium constituted by, for example, a non-volatile memory. An attaching/detaching mechanism (not shown) may also be provided so that the user can easily attach/detach the recording medium to/from the digital camera 100.

The memory I/F 106 arbitrates memory access requests from the processing units, and controls reading from and writing to the memory 107. The memory 107 is a volatile memory such as an SDRAM, and operates as a storage unit. The memory 107 provides a storage area for storing the above-described image data sets, various kinds of data such as audio data, or various kinds of data output from the processing units that constitute the digital camera 100.

Series of Operations Related to Successive Image Capture Processing

Figure 3:
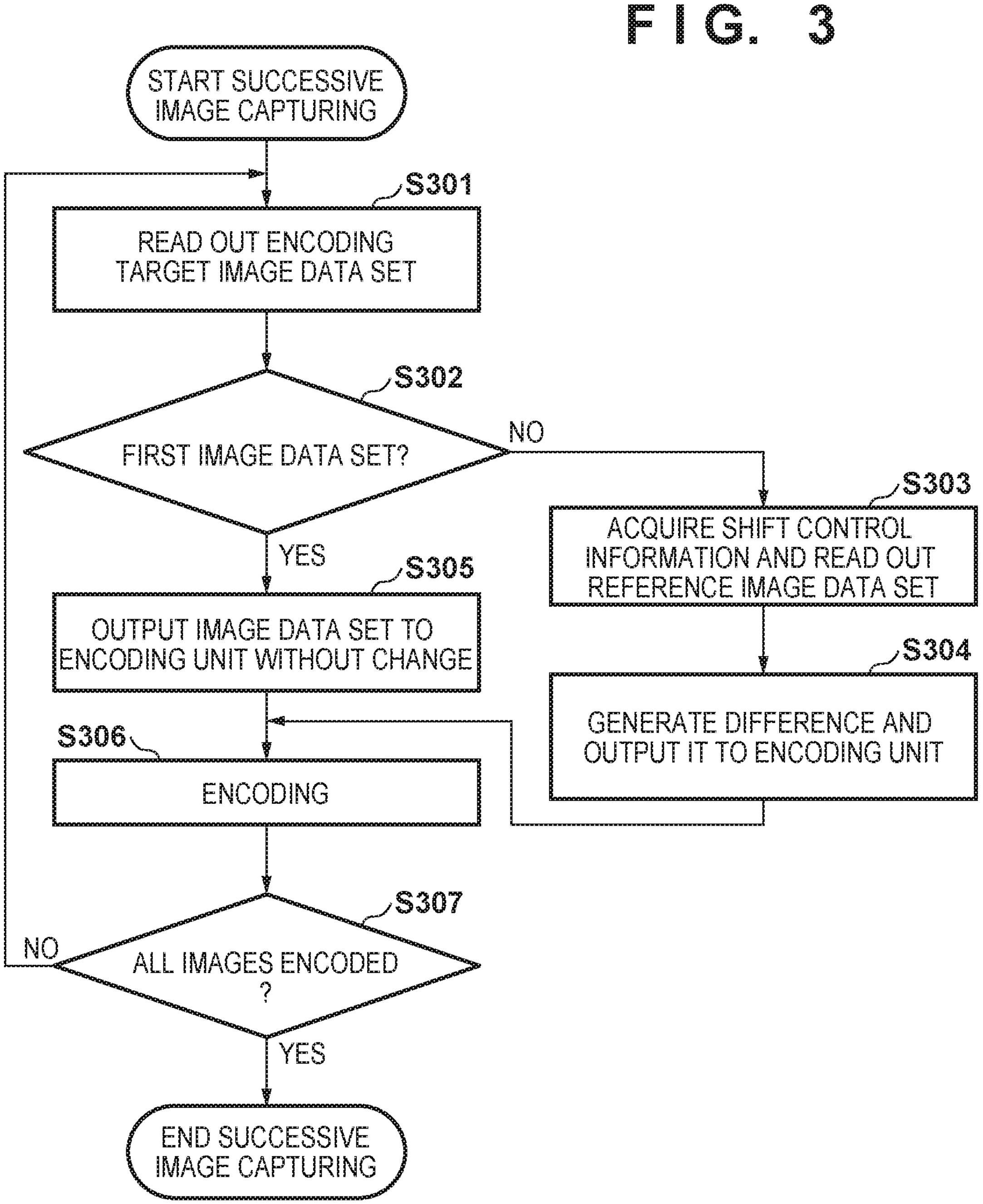
FIG. 3 is a flowchart showing sequential image capturing operations according to the first embodiment.

Next, the following describes a series of operations related to successive image capture processing with reference to FIG. 3.

Note that this processing is performed by the control unit 108 loading a program recorded on a ROM to a work area of the memory 107 and executing the program to control each unit of the digital camera 100, unless otherwise specified.

The following describes an example of processing performed after the image sensor shown in FIGS. 2A and 2B have been shifted three times in response to image capturing instructions from a user and four image data sets (RAW data sets) have been captured. In this case, all of the image data sets successively captured by the image capturing unit 101 are temporarily stored to the memory 107, and are thereafter read out by the difference generation unit 102.

In step S301, the difference generation unit 102 reads out an encoding target image data set stored in the memory 107 so that the encoding unit 103 can perform compression coding on the encoding target image data set.

In step S302, the difference generation unit 102 determines whether or not the image data set thus read out is the first image data set among the image data sets successively captured. If the image data set thus read out is the first image data set, the difference generation unit 102 proceeds to step S305. On the other hand, if the image data set thus read out is the second or later image data set, the difference generation unit 102 proceeds to step S303.

In step S303, the difference generation unit 102 subsequently reads out a reference image data set. Specifically, the difference generation unit 102 reads out the previous image data set captured immediately before the data set read out in step S301. In this regard, when executing this step in response to an instruction from the control unit 108, the difference generation unit 102 acquires a control amount that was used to shift the image sensor, from the control unit 108. In the present embodiment, a control amount indicates a relative shift direction and a shift amount applied during image capturing. In the present embodiment, a configuration in which the control unit 108 performs control to shift the image sensor is employed. Therefore, the difference generation unit 102 acquires, as a control amount, the shift direction and the shift amount used by the control unit 108 to shift the image sensor. However, a control amount in another form such as information that specifies coordinates may be employed as long as the control amount can be used to obtain a difference resulting from a shift of the image sensor. Also, a configuration in which a control amount regarding the image sensor is not acquired from the control unit 108, but from, for example, the image sensor may be employed as long as the difference generation unit 102 can acquire the control amount.

In step S304, upon the difference generation unit 102 finishing reading out the encoding target image data set and the reference image data set, the difference generation unit 102 obtains a difference between the encoding target image data set and the reference image data set based on the shift direction and shift amount acquired from the control unit 108. Then, the difference generation unit 102 outputs the difference to the encoding unit 103 as difference data. Difference generation processing performed by the difference generation unit 102 will be described later with reference to FIGS. 4A to 4C. In step S305, the difference generation unit 102 outputs the read image data set to the encoding unit 103 without change.

In step S306, the encoding unit 103 encodes the difference data output from the difference generation unit 102 through Huffman coding, for example, and outputs the encoded data set thus encoded, to the memory 107. Note that, if the first image data set is input to the encoding unit 103, the encoding unit 103 encodes the image data set.

In step S307, the control unit 108 determines whether or not all of the encoding target image data sets have been encoded, and if there is any image left unencoded, step S301 is performed again so that processing can be repeated. On the other hand, if all of the images have been encoded (i.e. if the last image among the four image data sets has been encoded), this processing is terminated. The encoded image data sets thus generated are recorded on the recording medium 105 by the recording processing unit 104.

Difference Data Generation Processing

Figure 4A:
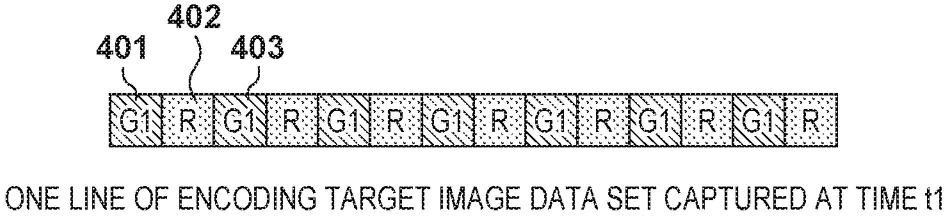
FIGS. 4A to 4C are diagrams illustrating an operation (1) that is performed to obtain differences regarding RAW data sets that are shifted in a horizontal direction, according to the first embodiment.
Figure 4B:
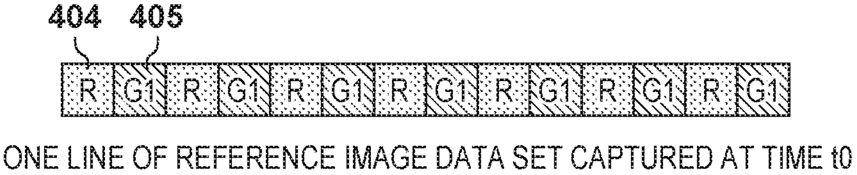
Figure 4C:
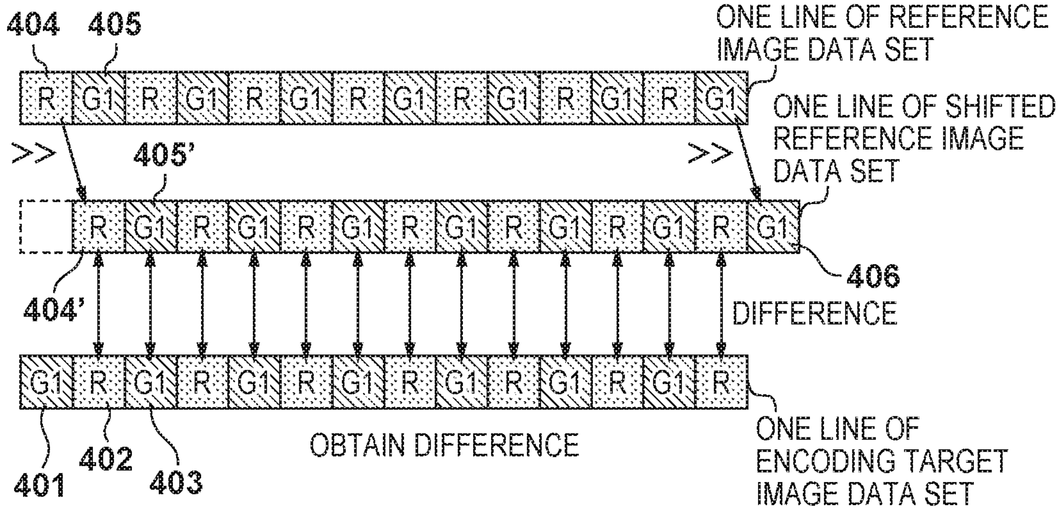

The following describes further details of processing that is performed in step S304 to generate difference data from an encoding target image data set and a reference image data set, with reference to FIGS. 4A to 4C.

FIG. 4A shows an example in which it is assumed that an image captured at time t1 shown in FIG. 2A is an encoding target image data set. To simplify the description, FIG. 4A shows the first line of the encoding target image data set. Reference numerals 401, 402, and 403 respectively indicate a G1 component, an R component, and a G1 component in the first line of the encoding target image data set.

FIG. 4B is an example in which an image captured at time t0 is used as a reference image data set, and shows the first line of the reference image data set read out in step S303 in FIG. 3. As described above with reference to FIG. 2A, this reference image data set is a data set obtained after an image was captured at time t0 and the image sensor was shifted to the right by one pixel. Reference numerals 404 and 405 respectively indicate an R component and G1 component in the first line of the reference image data set.

FIG. 4C schematically shows an example of an operation that is performed to store each piece of data in each line thus read out, to the storage elements of the difference generation unit 102, and to generate difference data. A line of the reference image data set (the uppermost line of data) in FIG. 4C corresponds to the one line of the reference image data set shown in FIG. 4B. The one line of data shown below the reference image data set is one line of a shifted reference image data set, which is the data set generated by shifting the one line of the reference image data set to the right by one pixel according to the shift amount of the image sensor. The R component 404 of the reference image data set after being shifted is indicated by a reference numeral 404'. The G1 component 405 of the reference image data set after being shifted is indicated by a reference numeral 405'. Furthermore, the lowermost line of data in FIG. 4C corresponds to the one line of the encoding target image data set shown in FIG. 4A.

That is, the difference generation unit 102 performs processing to shift one line of the reference image data set according to the shift direction and the shift amount of the image sensor, to obtain differences between the shifted reference image data set and the encoding target image data set. More specifically, the difference generation unit 102 obtains a difference between the R component 404' of the shifted reference image data set and the R component 402 of the encoding target image data set, and a difference between the G1 component 405' of the shifted reference image data set and the G1 component 403 of the encoding target image data set. Similarly, the difference generation unit 102 obtains a difference between the same color components (i.e. between signals in the same pixels) for each of the subsequent lines.

Note that, since the reference image data set was shifted to the right, there is no color component of the encoding target image data set that corresponds to the G1 component 406 and with which a difference is to be obtained. Similarly, since the reference image data set with which a difference is to be obtained was shifted to the right, there is no color component (of the reference image data set) that corresponds to the G1 component 401 of the encoding target image data set. In such a case, in the present embodiment, the difference generation unit 102 outputs the color component to the encoding unit 103 without change, without obtaining a difference.

Furthermore, difference data may be generated using a method that will be described with reference to FIGS. 5A to 5C. In the example of a method for generating difference data shown in FIGS. 5A to 5C, it is assumed that an image data set captured at time t1 in FIG. 2A is the encoding target image data set (FIG. 5A), and an image data set captured at time t0 is the reference image data set (FIG. 5B). As with FIGS. 4A to 4C, these figures only show one line of each image data set that is to be read out, to simplify the description. Also, as with the example described with reference to FIGS. 4A to 4C, the following describes an example in which the image sensor is shifted to the right by one pixel after an image is captured at time t0.

Figure 5A:
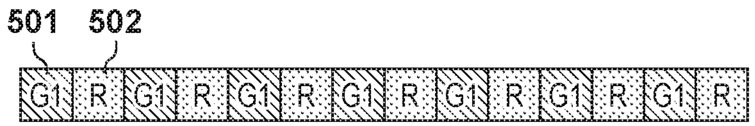
FIGS. 5A to 5C are diagrams illustrating an operation (2) that is performed to obtain differences regarding RAW data sets that are shifted in a horizontal direction, according to the first embodiment.
Figure 5B:
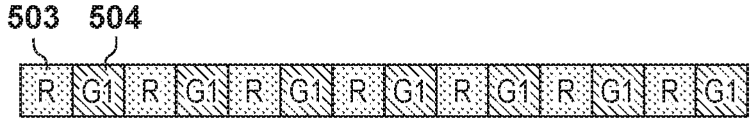

FIG. 5A shows the first line of the encoding target image data set captured at time t1, and reference numerals 501 and 502 respectively indicate a G1 component and an R component in the first line of the encoding target image data set. Similarly, FIG. 5B shows the first line of the reference image data set, and reference numerals 503 and 504 respectively indicate an R component and a G1 component in the first line of the reference image data set.

Figure 5C:
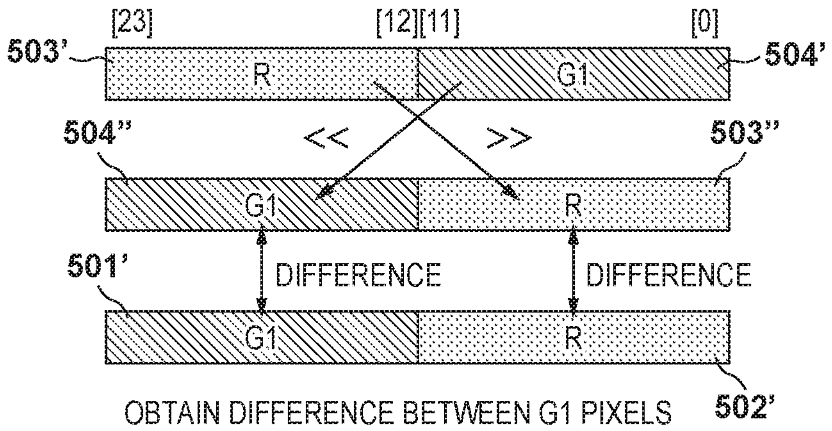

FIG. 5C shows an example of processing that is performed to store each piece of data in each line thus read out, to the storage elements of the difference generation unit 102, and to generate difference data. In this example, one color component is stored as twelve bits of data. An R component 503' and a G1 component 504' are the first two pixels in the first line of the reference image data set (corresponding to the components 503 and 504 in FIG. 5B), and the R component 503 and the G1 component 504 are respectively stored in the upper twelve bits and the lower twelve bits of the 24 bits of the storage elements. Similarly, a G1 component 501' and an R component 502' are the first two pixels in the first line of the encoding target image data set (corresponding to the components 501 and 502 in FIG. 5A), and the G1 component 501 and the R component 502 are respectively stored in the upper twelve bits and the lower twelve bits of the 24 bits of the storage elements.

The difference generation unit 102 generates an R component 503" by shifting the R component 503' of the reference image data set to the right by one pixel, and generates a G1 component 504" by shifting the G1 component 504' of the reference image data set to the left by one pixel, according to the shift amount of the image sensor. The difference generation unit 102 obtains a difference between the G1 component 504" of the shifted reference image data set thus generated and the G1 component 501' of the encoding target image data set. Similarly, the difference generation unit 102 obtains a difference between the R component 503" and the R component 502'. If differences are obtained in such a manner, differences can be obtained even with pixels at the ends of a line, and thus it is possible to improve encoding efficiency.

Figure 6A:
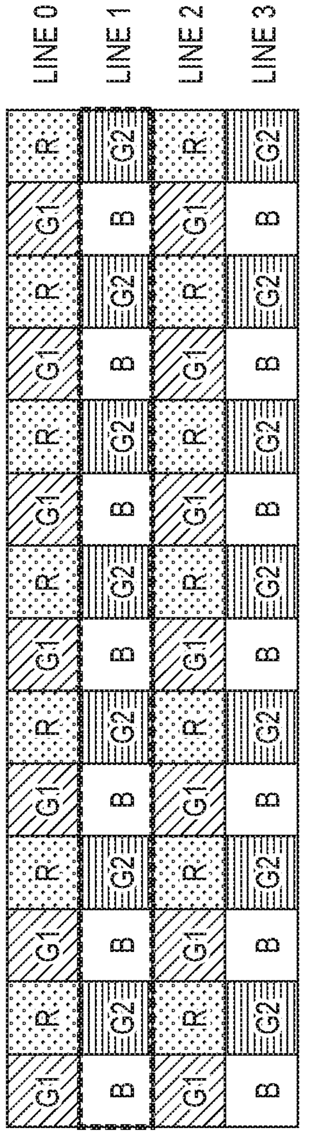
FIGS. 6A and 6B are diagrams illustrating an operation that is performed to obtain differences regarding RAW data sets that are shifted in a vertical direction, according to the first embodiment.
Figure 6B:
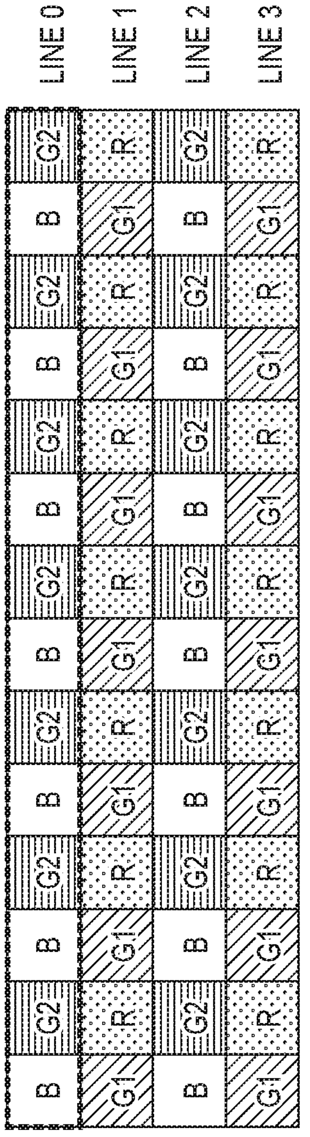

Furthermore, with reference to FIGS. 6A and 6B, the following describes a method for generating difference data when it is assumed that an image data set captured at time t2 is the encoding target image data set and an image data set captured at time t1 is the reference image data. Note that the shift direction and the shift amount used by the control unit 108 to shift the image sensor are also input to the encoding unit 103, and the encoding unit 103 superimposes the shift direction and the shift amount onto, for example, the header of an encoded stream that is to be output.

FIG. 6A shows the reference image data set captured at time t1 in FIG. 2A, and FIG. 6B shows the encoding target image data set captured at time t2 in FIG. 2B. Note that, as described above with reference to FIGS. 2A and 2B, the image sensor is shifted downward by one pixel after an image is captured at time t1.

To encode the line 0 shown in FIG. 6B at the beginning, it is necessary to use the line 1 shown in FIG. 6A, which includes the same color components, as the reference image data set. Therefore, after reading out the line 0 of the encoding target image data set, the difference generation unit 102 requests the memory I/F 106 to read out the line 1 of the reference image data set, to obtain the data of the line 1 of the reference image data set. Specifically, the difference generation unit 102 can obtain the data of the line 1 of the reference image data set by issuing an address of the line 1 of the reference image data set stored in the memory 107. Note that, as described above, the difference generation unit 102 has previously obtained a control amount indicating that the image sensor was shifted downward by one pixel during the period from time t1 to time t2, from the control unit 108. Therefore, it is possible to perform control to shift the lines of the encoding target image data set (the line 0 in this example) downward by one pixel, and read out the reference image data set.

Thus, it is possible to obtain difference data regarding differences between the same color components of the encoding target image data set and the reference image data set, and to provide the encoding unit 103 with the difference data. In particular, in a RAW image that has not undergone gain adjustment or the like, each color has a different input level. Therefore, obtaining differences between the same color components leads to higher correlation. Consequently, difference values are likely to be small, and it can be expected that encoding efficiency is improved.

As described above, in the present embodiment, the reference image data set is shifted based on the control amount (the shift amount and the shift direction) used to shift the image sensor, and differences between the same color components (between signals in the same pixels) of the reference image data set and the encoding target image data set that is to be encoded are obtained. Thus, it is possible to improve encoding efficiency, and to reduce the recording data amount of a plurality of RAW data sets captured at points in time that are close to each other (when super-resolution processing is performed).

Second Embodiment

Next, the following describes a second embodiment. The second embodiment is different from the first embodiment in terms of the region of the image sensor that is used to generate a RAW data set, and all of the pixels of the image sensor are used to generate a RAW data set. Note that the configuration of the digital camera according to the present embodiment is the same as the configuration of the digital camera according to the first embodiment. Therefore, the same components are assigned the same reference numerals, duplicate descriptions are omitted, and differences will be mainly described.

Figure 7A:
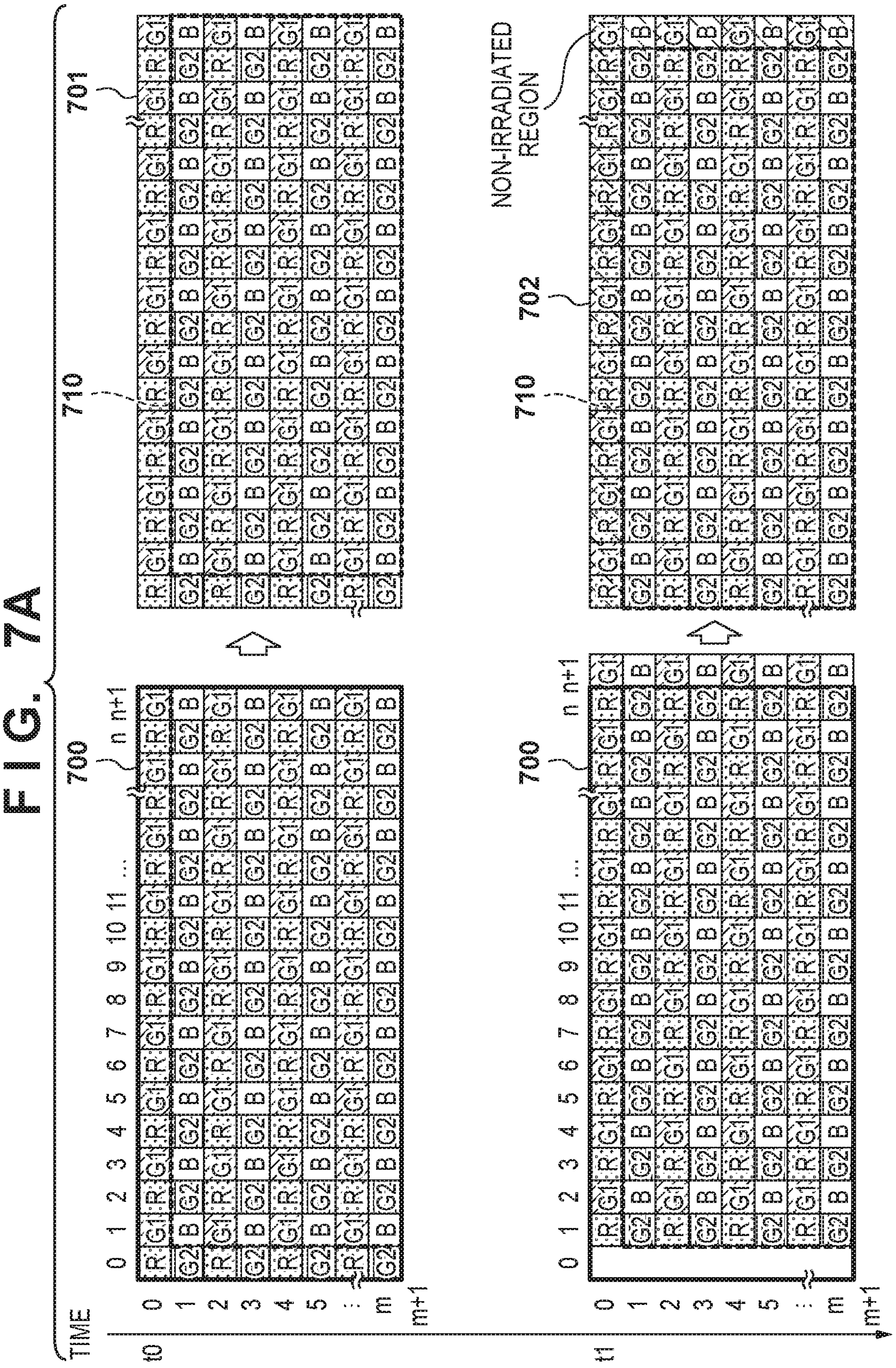
FIGS. 7A and 7B are diagrams illustrating a relationship between an image sensor and a RAW data set when images are sequentially captured while the image sensor of an image capturing unit according to a second embodiment is shifted.
Figure 7B:
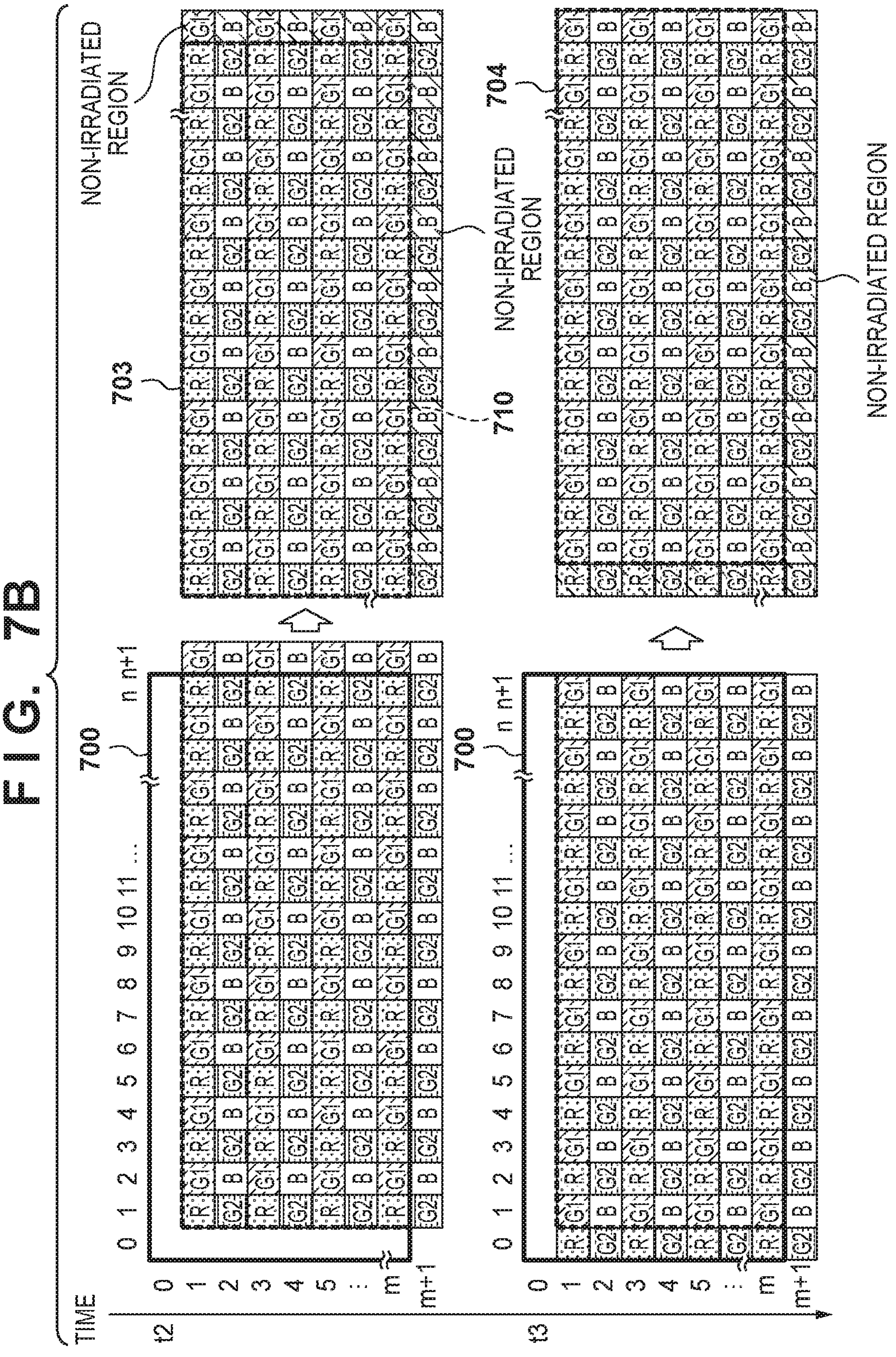

The following describes a RAW image data set that is generated in the present embodiment, with reference to FIGS. 7A and 7B. FIGS. 7A and 7B show, in chronological order, a relationship between the position of the image sensor when images are successively captured while the image sensor is shifted by one pixel at a time and how the image sensor is irradiated with light, and RAW data sets thus generated. A region 700 (indicated by the thick frames in the figure) is a region of light (irradiation light) with which the image sensor is irradiated. As with FIGS. 2A and 2B, FIGS. 7A and 7B show an example in which images are successively captured at time t1 to time t3 while the image sensor is shifted by one pixel at a time, where the vertical axis indicates the flow of time.

At time t0, the image sensor is at a location whose point of origin is indicated by coordinates (0,0). The image sensor receives irradiation light on the region 700 to generate a RAW data set 701, which is arranged in raster order starting from an R component. The frame depicted as a dotted line on the RAW data set 701 will be described later. Next, at time t1, the image sensor is shifted to the right by one pixel from the state at time t0, and captures an image at a location whose point of origin is indicated by coordinates (1,0), to generate a RAW data set 702, which is arranged in raster order starting from an R component.

At time t2, the image sensor is shifted downward by one pixel from the state at time t1, and captures an image at a location whose point of origin is indicated by coordinates (1,1), to generate a RAW data set 703, which is arranged in raster order starting from an R component. At time t3, the image sensor is shifted to the left by one pixel from the state at time t2, and captures an image at a location whose point of origin is indicated by coordinates (0,1), to generate a RAW data set 704, which is arranged in raster order starting from an R component.

Thus, in the example shown in the present embodiment, all of the pixels of the image sensor are used to generate a RAW data set, and therefore all of the first pixels in raster order are R components. Therefore, it is possible to obtain differences between the same color components without shifting either the reference image data set or the encoding target image data set according to the shift amount and shift direction of the image sensor.

However, if all of the pixels of the image sensor are used to generate a RAW data set as shown in FIGS. 7A and 7B, certain pixels are not irradiated with light because the image sensor is shifted. For example, in the RAW data sets 702, 703, and 704, non-irradiated regions indicated with shadow are pixel regions that are not irradiated with light. These non-irradiated regions are not used when a RAW data set is developed, and need not be encoded. That is, it is possible to further reduce the code amount by only storing an image included in a frame 710, which is depicted as a dotted line on each of the images respectively generated at the points in time, as a RAW data set.

Therefore, in the present embodiment, only an image included in the dotted line frame 710 is used to generate difference data, and differences between the same color components are obtained by shifting the reference image data set using the shift amount and the shift direction of the image sensor, in the same manner as how the difference data is generated in the first embodiment. Thus, it is possible to obtain difference data regarding differences between the same color components in the encoding target image data set and the reference image data set, and to allow the difference data to be encoded by the encoding unit 103. In this regard, since control is performed so that the non-irradiated region is not encoded, it is possible to reduce the code amount. That is, for example, when super-resolution processing is to be performed, it is possible to reduce the recording data amount of a plurality of RAW data sets captured at points in time that are close to each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-082250, filed Apr. 18, 2017, which is hereby incorporated by reference herein in its entirety.

What is claimed is:

1. An image capturing apparatus comprising:

an image sensor configured to capture a plurality of RAW image data sets while a position of the image sensor relative to an optical axis is sequentially shifted;

one or more processors; and a memory storing instructions which, when the instructions are executed by the one or more processors, cause the image capturing apparatus to function as:

a difference generation unit configured to generate difference data regarding the plurality of RAW image data sets;

an encoding unit configured to encode the difference data; and a recording unit configured to record the encoded difference data, wherein, when generating difference data regarding a first RAW image data set and a second RAW image data set included in the plurality of RAW image data sets, the difference generation unit shifts the first RAW image data set, and obtains a difference between pieces of pixel data having the same color component, respectively included in the first RAW image data set and the second RAW image data set, to generate the difference data, wherein the difference generation unit generates, for every two successive RAW image data sets included in the plurality of RAW image data sets, the difference data that indicates a difference from the second RAW image data set, using the second RAW image data set and the first RAW image data set that is the previous RAW image data set captured immediately before the second RAW image data set.

2. The apparatus according to claim 1, wherein the image sensor is configured to be sequentially shifted.

3. The apparatus according to claim 1, wherein the optical axis is configured to be sequentially shifted.

4. The apparatus according to claim 1, wherein the plurality of RAW image data sets are RAW image data sets each arranged in a Bayer arrangement.

5. The apparatus according to claim 1, wherein the plurality of RAW image data sets are RAW image data sets that have not undergone gain adjustment.

6. The apparatus according to claim 1, wherein the plurality of RAW image data sets respectively include pieces of data having different color components, at the same coordinate point.

7. The apparatus according to claim 1, wherein the difference generation unit outputs a RAW image data set that was first captured from among the plurality of RAW image data sets without generating the difference data for the RAW image data set that was first captured, wherein the encoding unit encodes the RAW image data set that was first captured and the difference data generated by the difference generation unit.

8. The apparatus according to claim 1, wherein the image sensor outputs signals from pix included in an irradiated region of the image sensor as a RAW image data set.

9. The apparatus according to claim 1, wherein the difference generation unit excludes pieces of pixel data included in a non-irradiated region of the image sensor from pieces of pixel data of a RAW image data set, to generate the difference data.

10. An image capturing apparatus comprising:

an image sensor configured to capture a plurality of RAW image data sets while a position of the image sensor relative to an optical axis is sequentially shifted;

one or more processors; and a memo storing instructions which, when the instructions are executed by the one or more processors, cause the image capturing apparatus to function as:

a control unit configured to control shifting of the image sensor;

a difference generation unit configured to generate difference data regarding the plurality of RAW image data sets;

an encoding unit configured to encode the difference data; and a recording unit configured to record the encoded difference data, wherein, when generating difference data regarding a first RAW image data set and a second RAW image data set included in the plurality of RAW image data sets, the difference generation unit shifts the first RAW image data set, and obtains a difference between pieces of pixel data having the same color component, respectively included in the first RAW image data set and the second RAW image data set, to generate the difference data, wherein the difference generation unit shifts the first RAW image data set according to a control amount used by the control unit to shift the image sensor and wherein the encoding unit records the control amount used by the difference generation unit onto a header of the encoded difference data.

11. The apparatus according to claim 10, wherein the control amount indicates a shift direction and a shift amount of the image sensor shifted from when the first RAW image data set is captured to when the second RAW image data set is captured.

12. A control method of an image capturing apparatus that captures a plurality of RAW image data sets while a position of an image sensor relative to an optical axis is sequentially shifted, the method comprising:

controlling shifting of the image sensor;

generating difference data regarding the plurality of RAW image data sets;

encoding the difference data; and recording the encoded difference data;

wherein, when difference data regarding a first RAW image data set and a second RAW image data set included in the plurality of RAW image data sets is to be generated, the first RAW image data set is shifted, and a difference between pieces of pixel data having the same color component, respectively included in the first RAW image data set and the second RAW image data set, is obtained, and thus the difference data is generated, wherein the generating difference data includes shifting the first RAW image data set according to a control amount used in the controlling shifting of the image sensor, and wherein the recording the encoded difference data includes recording the control amount used in the generating difference data onto a header of the encoded difference data.

13. A non-transitory computer-readable storage medium storing a program for causing a computer to execute a control method of an image capturing apparatus that captures a plurality of RAW image data sets while a position of an image sensor relative to an optical axis is sequentially shifted, the method comprising:

controlling shifting of the image sensor;

generating difference data regarding the plurality of RAW image data sets;

encoding the difference data; and recording the encoded difference data, wherein, when difference data regarding a first RAW image data set and a second RAW image data set included in the plurality of RAW image data sets is to be generated, the first RAW image data set is shifted, and a difference between pieces of pixel data having the same color component, respectively included in the first RAW image data set and the second RAW image data set, is obtained, and thus the difference data is generated, wherein the generating difference data includes shifting the first RAW image data set according to a control amount used in the controlling shifting of the image sensor, and wherein the recording the encoded difference data includes recording the control amount used in the generating difference data onto a header of the encoded difference data.

* * * * *